Feb. 21, 1939.  J. H. VAN UUM  2,148,091
SPRING CLIP DEVICE
Filed May 28, 1937

INVENTOR.
JOHN H. VAN UUM
BY
John H. Leonard,
his ATTORNEY.

Patented Feb. 21, 1939

2,148,091

UNITED STATES PATENT OFFICE 2,148,091

SPRING CLIP DEVICE

John H. Van Uum, Lakewood, Ohio

Application May 28, 1937, Serial No. 145,334

9 Claims. (Cl. 85—5)

This invention relates to a snap fastening device or spring clip for fastening members to an apertured support, one of the principal objects being to provide a clip which may be installed with very slight pressure but which effects interlocking engagement with the support.

A more specific object is to provide a clip of this character in which the head of the clip is effective for augmenting the spring tension afforded by the aperture gripping legs of the clip.

Another specific object is to provide a clip of this character which will maintain its proper position within the aperture in which inserted.

Another object is to provide a clip for this purpose which may readily be formed from a single strip of spring metal.

Other objects and advantages will become apparent from the following specification wherein reference is made to the drawing, in which.

Figure 1:
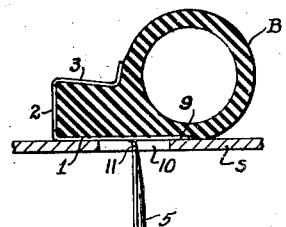
Fig. 1 is an end elevation of the clip embodying the principles of the present invention and installed in a support and supporting a rubber door bumper, the support and bumper being shown in section for clearness in illustration.
Figure 2:
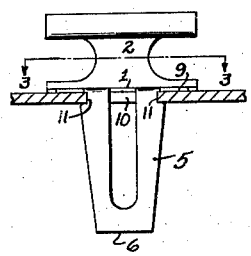
Fig. 2 is a front elevation of the clip illustrated in Fig. 1, the supported member being removed for clearness in illustration.
Figure 3:
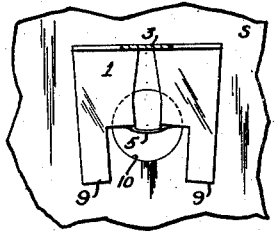
Fig. 3 is a sectional view of the clip taken on a plane indicated by the line 3—3 in Fig. 2.

Referring to the drawing, the clip illustrated in Figs. 1 to 4 comprises a strip of spring metal having a portion in the form of a head 1 which is adapted to lie on the outer face of the support to which the member is to be secured when the clip is installed. The head 1 may have any suitable clamping or attachment portion or portions thereon for attachment to the member to be supported. The form illustrated is one in which the clip is adapted for use in connection with a rubber door bumper. The head 1 shown for purposes of illustration has one end bent upwardly, as indicated at 2, and then outwardly, as indicated at 3, to form a substantially C-shaped clamp by which the rubber bumper B may be engaged and held in place.

Integral with the head portion 1 and extending substantially at right angles to the plane thereof are portions in the form of integral legs 5 which at the lower ends are connected together and provide a portion in the form of a nose 6. The legs 5 are convergent toward the nose 6. The legs 5 and nose 6 form the shank of the clip and are bent so that the shank is arcuate, as better illustrated in Fig. 3, about an axis normal to the head portion 1 or extending lengthwise of the legs and shank so as to afford greater rigidity of the legs.

Figure 4:
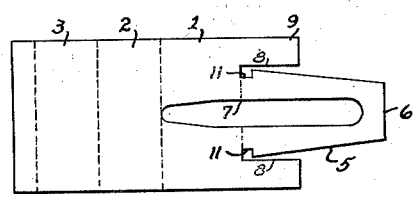
Fig. 4 is a plan view of a blank illustrating the method of forming the clip therefrom.

As better illustrated in Figs. 4 the clip is formed by stamping out a portion of the strip, as indicated at 7, the removed portion of the metal thus providing head portions which are unconnected with and spaced from each other partway of their length parallel to the outer surface of the support S. Further, the strip is slit, as indicated at 8, so that when the legs are normal or angularly disposed to the plane of the head portions 9, the head portions 9 engage the outer surface of the support. Apart from the arcuate shape provided on the shank portion, the legs 5 lie substantially in a plane normal to the head and are spaced edgewise from each other and are movable toward and away from each other edgewise by flexure about the nose portion. The spaced head portions 9 are movable concurrently by flexure so that the spring effect of the legs 5 and of the head portions 9 mutually augment each other in providing an outward yielding pressure for securely fastening the clip in a supporting structure S. Thus the legs 5 and head portions 9 provide a closed resilient loop with parts thereof in angularly disposed planes.

The clip is received through an aperture 10 in the support S by flexure of the legs 5 and head portions 9 edgewise toward each other, the legs 5 and separated head portions 9 reflexing after insertion to anchor the clip firmly in place in the aperture 10. In order to positively lock the clip into engagement with the support, the clip, and preferably the legs 5 are provided with notches 11 adjacent the head 1, the notches 11 being of such width that each snugly engages both faces of the supporting structure adjacent the aperture for positively locking the clip thereto when the head 1 is juxtaposed on the outer surface of the support.

Due to the fact that the edges of the stock at the bottoms of the slots 11 engage the marginal face portions of the support adjacent the opening, they tend to cut into the support slightly and thus anchor the clip in position against rotation about the axis of the aperture and also against appreciable movement laterally of the aperture. The depth of the notches 11 is preferably such that the clip will be received in the aperture and engage the support only at the diameter of the aperture when the notches are seated on the support. Thus any lateral movement of the clip necessitates flexure of the legs. Any attempted movement of the clip normal to the support, however, is positively prevented due to the positive interlock of the notches 11 and the support. Consequently the clip, though having loop portions lying in intersecting planes, is in effect a closed loop as illustrated in Fig. 4, so that the spring pressure of all of the metal is effective for flexing the legs and notches 11 into interlocking engagement with the support.

Figure 5:
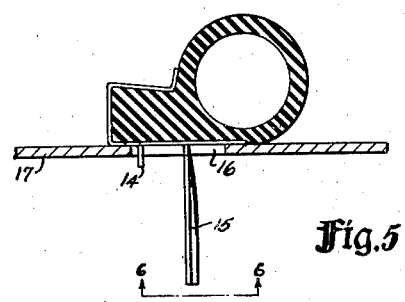
Fig. 5 is a side elevation of a modified form of the clip illustrated in Fig. 1.
Figure 6:
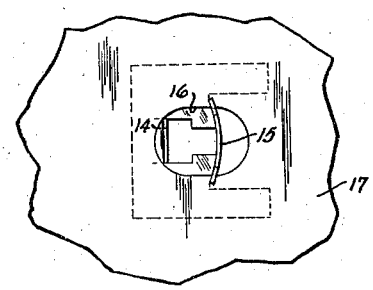
Fig. 6 is a bottom plan view of the clip illustrated in Fig. 5, as viewed from the line 6—6 in Fig. 5.

If in any instance it is desirable to utilize a clip in an aperture wherein the clip is not disposed at the diameter of the aperture or if in any instance it is desired to use a clip in connection with a non-circular aperture provision may be made for preventing lateral displacement of the clip with the resultant disengagement of the notches 11 from the support. Such a clip is illustrated in Figs. 5 and 6, wherein a part of the metal cut from the head portion, as indicated at 7, in Fig. 4, is not completely removed but is folded downwardly forming a positioning lug, as indicated at 14 in Figs. 5 and 6, the locking lug 14 engaging within the aperture when the notches and legs are in their proper position. Thus the legs, indicated at 15 in Fig. 6, and the lug 14 cooperate to position the clip properly in the associated aperture 16 of the support 17.

Figure 7:
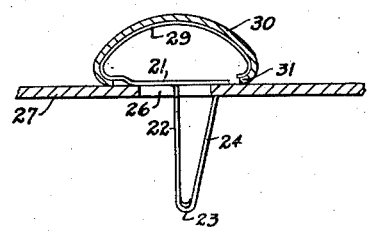
Fig. 7 is an end elevation of another modification of the clip illustrated in Fig. 1.
Figure 8:
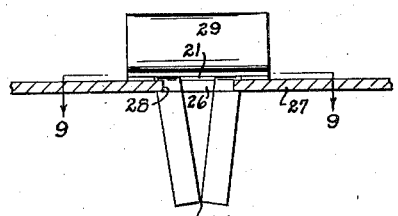
Fig. 8 is a front elevation of the clip illustrated in Fig. 7.
Figure 9:
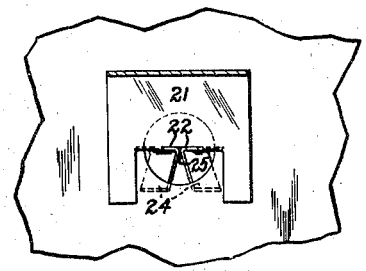
Fig. 9 is a sectional view taken on the plane indicated by the line 9—9 in Fig. 8.

Referring next to Figs. 7 and 8, another modification of the clip is illustrated though certain advantages are provided by the foregoing structures over that illustrated in Figs. 7 and 8. In this form of clip, a head portion 21 is provided with two separate depending legs 22, each of which is bent upwardly intermediate its ends to form a nose portion 23 and a free locking leg portion 24. Each of the legs 22 is thus joined by a nose portion 23 with a leg portion 24. The legs 22 form a shank, and the two shanks thus formed are convergent downwardly so that the nose portions 23 of the clip abut each other at their adjacent edges, as indicated at 25, thus forming in effect a closed loop and constraining the shanks and legs from edgewise movement at their lower ends. The clip is inserted nose foremost through the aperture 26 in the support 27, the free ends of the locking leg portions 24 flexing flatwise inwardly toward the legs 22 during insertion and reflexing so that they engage the inner face of the support adjacent the aperture. Concurrently, the legs 22 and the separated head portions 21 flex edgewise toward each other and reflex edgewise for engaging the walls of the aperture. The portions 24 move edgewise with the legs 22.

If desired, suitable positive locking shoulders 28 may be provided on the leg portions 22 adjacent the head so as to receive the edges of the support adjacent the opening in the same manner as the notches 11 heretofore described in connection with Figs. 1 to 4. Also, the free ends of the leg portions 24, upon flatwise reflexure, engage the inner surface of the support and assist in locking the clip thereto.

In Fig. 7, the head portion 21 has been shown as having an integral bead trim fastening portion 29 which is received, by flexure, within the bead trim 30 and reflexes to engage the inturned flanges 31 of the bead trim.

It is apparent from the foregoing description that a clip is provided which may be readily inserted into the aperture of the support and which will upon reflexure afford very tight and positive locking engagement with the support. Further, it is apparent that the head portion may be of any desired form depending upon the particular element to be secured to the supporting structure. The forms of the clip disclosed in the drawing are preferred embodiments shown for purposes of illustration only and are not to be limited to the specific embodiments shown but limited only as set forth in the appended claims.

Having thus described my invention, I claim:

1. A spring clip for securing a member to an apertured support and comprising a single strip of relatively flat spring metal having a head portion for connection with a member to be secured to the support and an integral shank portion comprising a nose portion and leg portions and being in substantial edgewise alignment integral therewith and extending therefrom and disaligned flatwise of the legs from each other for their entire length in spaced relation to each other edgewise throughout substantially their entire length and receivable nose foremost through an aperture in the support and said legs being arranged for edgewise flexure toward each other during insertion and edgewise reflexure after insertion for securing the clip in position on the support.

2. A spring clip for securing a member to an apertured support and comprising a single piece of relatively flat spring metal having a portion in the form of a head for attachment to the member to be secured to the support and having portions in the form of legs extending therefrom and substantially aligned in edgewise spaced relation to each other and having a portion in the form of a nose connecting the lateral edges of the legs to each other at a location remote from the head and about which nose portions said legs may flex edgewise toward and away from each other in a common plane, and said legs being receivable nose foremost through an aperture in said support and being movable toward each other edgewise upon insertion, reflexing edgewise after insertion for interlocking the clip and the support.

3. A spring clip for securing a member to an apertured support and comprising a single strip of relatively flat spring metal having a portion in the form of a head for overlying the outer face of the support when the clip is installed thereon and having portions in the form of spaced legs integral with and extending from the head generally normal to the plane of the head and in substantial edgewise alignment with each other and in edgewise spaced relation to each other throughout substantially their entire length and disaligned flatwise of the legs from each other for their entire length and operatively connected together at their ends remote from the head, said legs being receivable connected end foremost through an aperture in the support by flexure of the legs edgewise toward each other, said legs reflexing edgewise after insertion through said aperture for interlocking the clip and the support, and means on the head portion for attachment to the member to be supported.

4. A spring clip for securing a member to an apertured support and comprising a single piece of relatively flat spring metal having portions in the form of edgewise spaced co-planar legs operatively connected together at one end and receivable joined end-foremost through an aperture in a support by edgewise flexure of said portions relatively toward each other, and having a portion for connection to a member to be supported and positioned outwardly of the support from the joined ends when the clip is installed on the support, and said legs having notches at their outer lateral limits and spaced from their joined ends for receiving the margins of the wall of the support defining the aperture when the legs reflex toward their normal position for positively locking the clip to the support.

5. A spring clip for securing a member to an apertured support comprising a single piece of relatively flat spring metal having a portion for attachment to the member to be secured to the support and having portions in the form of legs extending therefrom and disaligned flatwise of the legs from each other for their entire length in edgewise spaced relation to and in substantial edgewise alignment with each other throughout substantially their entire length and constrained from movement toward each other at the ends remote from the first portion, and being receivable ends foremost through an aperture in said support and movable toward each other edgewise during insertion by flexure edgewise, and said legs reflexing edgewise after insertion for interlocking the clip and the support.

6. A spring clip for securing a member to an apertured support comprising a single strip of relatively flat spring metal having a portion in the form of a head for connection to said member and overlying the outer face of the support when the clip is installed on the support, and having portions in the form of integral edgewise spaced legs extending generally normal to the plane of the head and connected together at their ends remote from the head and being receivable connected end-foremost through an aperture in the support by flexure of the leg portions edgewise toward each other, said leg portions reflexing edgewise after insertion through said aperture for interlocking the clip and the support, and a positioning lug on the head and receivable in the aperture and cooperating with the legs to constrain the clip from displacement transversely of the aperture.

7. A spring clip for securing a member to an apertured support comprising a single strip of relatively flat spring metal having a portion in the form of a head arranged for connection to a member to be supported and leg portions extending from the plane of said head and positioned in edgewise spaced relation to and edgewise alignment with each other throughout a substantial portion of their length and abutting at their end portions remote from the head, and receivable through an aperture in the support abutting ends foremost, said legs being arranged for edgewise flexure during insertion in the aperture and reflexing edgewise after insertion for securing the clip to the support.

8. A spring clip for securing a member to an apertured support comprising a single strip of relatively flat spring metal having a portion in the form of a head arranged for connection to a member to be supported and substantially co-planar leg portions extending from the plane of said head and positioned in edgewise spaced relation to each other throughout a substantial portion of their length and abutting at their end portions remote from the head, and receivable through an aperture in the support abutting ends foremost, said legs being arranged for edgewise flexure during insertion in the aperture and reflexing edgewise after insertion for securing the clip to the support, said legs having integral locking portions respectively extending from their abutting ends back toward the plane of the head and flexing edgewise with the legs and also flatwise toward the legs during insertion and flatwise away from the legs and into locking engagement with the support after insertion.

9. A spring clip for securing a member to an apertured support comprising a single strip of relatively flat spring metal having a head for connection to the member to be supported, and having portions integral with said head in the form of legs spaced from each other and extending from the plane of the head and positioned in edgewise spaced relation to and in edgewise alignment with each other and operatively connected together at their ends remote from the head, thereby providing a shank receivable through an aperture in the said support, said legs being arranged for edgewise flexure during insertion in the aperture and reflexure edgewise after insertion for securing the clip to the support, portions of said head at points of juncture of the heads and said legs and for a material distance therefrom being spaced from each other edgewise of the head for affording movement of the spaced portions of said head together edgewise, said spaced portions of the head being joined together to form an integral portion at a location remote from the legs, permitting torsional action of the integral portion of the head beyond the joined portion when the clip is installed in the support.

JOHN H. VAN UUM.